(12) United States Patent
Hsu et al.

(10) Patent No.: US 10,223,592 B2
(45) Date of Patent: Mar. 5, 2019

(54) METHOD AND ASSOCIATED APPARATUS FOR PERFORMING COOPERATIVE COUNTING WITH AID OF MULTIPLE CAMERAS

(71) Applicant: Synology Incorporated, Taipei (TW)

(72) Inventors: Szu-Lu Hsu, Taipei (TW); Yu-Hsiang Chiu, Taipei (TW); Szu-Hsien Lee, Taipei (TW)

(73) Assignee: Synology Incorporated, Taipei (TW)

( * ) Notice: Subject to any disclaimer, the term of this patent is extended or adjusted under 35 U.S.C. 154(b) by 0 days.

(21) Appl. No.: 15/595,910

(22) Filed: May 15, 2017

(65) Prior Publication Data

US 2018/0107878 A1    Apr. 19, 2018

(30) Foreign Application Priority Data

Oct. 14, 2016    (TW) .............................. 105133217 A

(51) Int. Cl.
*G06K 9/00* (2006.01)
*G06T 7/70* (2017.01)
(Continued)

(52) U.S. Cl.
CPC ..... *G06K 9/00718* (2013.01); *G06K 9/00771* (2013.01); *G06K 9/00778* (2013.01);
(Continued)

(58) Field of Classification Search
CPC ..... G06K 2009/00738; G06K 9/00718; G06K 9/00771; G06K 9/623; G06K 9/00778;
(Continued)

(56) References Cited

U.S. PATENT DOCUMENTS

2005/0073585 A1    4/2005  Ettinger
2015/0116487 A1    4/2015  Ptitsyn
(Continued)

FOREIGN PATENT DOCUMENTS

CN    103164706 A      6/2013
EP    2 903 261 A1     8/2015
(Continued)

OTHER PUBLICATIONS

Naci, Suphi Umut; European Search Report; European Application No. 17178658.5; dated Dec. 15, 2017; European Patent Office; Munich, Germany.

*Primary Examiner* — Tom Y Lu

(74) *Attorney, Agent, or Firm* — Stevens & Showalter, LLP

(57) ABSTRACT

A method for performing cooperative counting and an associated apparatus are provided, where the method is applicable to a counter system, and the counter system includes a plurality of cameras. The method includes: setting a plurality of points on an electronic map as a plurality of predetermined points according to user inputs; determining at least one rule related to the predetermined points according to rule information, where the rule information is stored in the counter system; respectively performing video object detection upon a plurality of images captured by the cameras to generate detection results respectively corresponding to the cameras; and merging the detection results respectively corresponding to the cameras, to count events complying with the at least one rule.

18 Claims, 10 Drawing Sheets

(51) Int. Cl.
*G06K 9/62* (2006.01)
*G06T 11/60* (2006.01)
*H04N 7/18* (2006.01)
*G07C 9/00* (2006.01)

(52) U.S. Cl.
CPC ............... *G06K 9/623* (2013.01); *G06T 7/70* (2017.01); *G06T 11/60* (2013.01); *G07C 9/00* (2013.01); *H04N 7/181* (2013.01); *G06K 2009/00738* (2013.01); *G06T 2207/10016* (2013.01); *G06T 2207/20221* (2013.01); *G06T 2207/30196* (2013.01); *G06T 2207/30232* (2013.01); *G06T 2207/30242* (2013.01)

(58) Field of Classification Search
CPC ........... G06T 11/60; G06T 2207/10016; G06T 2207/20221; G06T 2207/30196; G06T 2207/30232; G06T 2207/30242; G06T 7/70; H04N 7/181; G07C 9/00
See application file for complete search history.

(56) References Cited

U.S. PATENT DOCUMENTS

| | | | |
|---|---|---|---|
| 2015/0199810 A1* | 7/2015 | Lee | G06K 9/00771 382/103 |
| 2015/0199815 A1* | 7/2015 | Jo | G06K 9/00771 382/103 |
| 2015/0381946 A1 | 12/2015 | Renkis | |

FOREIGN PATENT DOCUMENTS

| | | |
|---|---|---|
| TW | 201026025 | 7/2010 |
| TW | 201507469 A | 2/2015 |

* cited by examiner

METHOD AND ASSOCIATED APPARATUS FOR PERFORMING COOPERATIVE COUNTING WITH AID OF MULTIPLE CAMERAS

BACKGROUND OF THE INVENTION

1. Field of the Invention

The present invention relates to performing video object detection based on live view images, and more particularly, to a method and associated apparatus for performing cooperative counting, in which the method and apparatus are applicable to a counter system comprising multiple cameras.

2. Description of the Related Art

Methods for detecting the presence of pedestrians in a particular environment have been proposed, with varying levels of accuracy. Some methods used to identify one or more pedestrians are based on a normal image captured by a single camera. In practice, the accuracy is highly dependent upon image quality. The result is that conventional detection methods may fail to properly detect one or more pedestrians in a wide-angle image, as the pedestrians in the image are usually distorted. As the related arts methods are limited when using a single camera, there is a need for a novel method and related mechanism to improve the efficiency.

SUMMARY OF THE INVENTION

An objective of the present invention is to provide a method and associated apparatus for performing cooperative counting in order to solve the above-mentioned problems of the related art.

Another objective of the present invention is to provide a method and associated apparatus for performing cooperative counting, to ensure that any event complying with at least one rule will not be skipped.

At least one embodiment of the present invention provides a method for performing cooperative counting. The method is applicable to a counter system, in which the counter system includes a plurality of cameras. The counter system may be implemented with a surveillance system, and the method may include the following steps: setting a plurality of points on an electronic map as a plurality of predetermined points according to user inputs; determining at least one rule related to the predetermined points according to rule information, where the rule information is stored in the counter system; performing video object detection upon a plurality of images captured by the cameras, respectively, to generate detection results respectively corresponding to the cameras; and merging the detection results respectively corresponding to the cameras in order to count events complying with the at least one rule.

In addition to the above method, the present invention further provides an associated apparatus for performing cooperative counting. The apparatus is applicable to a counter system which includes a plurality of cameras. The counter system may be implemented with a surveillance system. The apparatus may include an interface circuit and a processing circuit. The interface circuit is arranged to couple to the cameras. The processing circuit is coupled to the interface circuit, and arranged to control operations of the apparatus. For example, the processing circuit may refer to the user inputs to set a plurality of points on an electronic map as a plurality of predetermined points. Further, the processing circuit may refer to user inputs to set a plurality of points on an electronic map as a plurality of predetermined points. In addition, the processing circuit may refer to rule information to determine at least one rule related to the predetermined points, in which the rule information is stored in the counter system. Furthermore, the processing circuit may perform video object detection upon a plurality of images captured by the cameras, respectively, in order to generate detection results respectively corresponding to the cameras. Moreover, the processing circuit may merge the detection results respectively corresponding to the cameras in order to count events complying with the at least one rule.

The method and apparatus of the present invention may improve the reliability of the counter system as compared with the related arts. Further, the method and apparatus of the present invention may ensure that the accuracy of the counting data of video object(s) will not be affected by the inherent limitation of a single camera. In addition, the method and apparatus of the present invention may allow the user of the counter system to specify at least one predetermined line segment or predetermined area on the electronic map, where associated calculation result(s) may be mapped onto the electronic map to allow the user to immediately perceive meanings represented by various monitoring data.

These and other objectives of the present invention will no doubt become obvious to those of ordinary skill in the art after reading the following detailed description of the embodiments illustrated in the various figures and drawings.

DETAILED DESCRIPTION

One or more embodiments of the present invention provide a method and associated apparatus for performing cooperative counting. The method and apparatus are applicable to a counter system including multiple cameras. For example, the counter system may be implemented with a surveillance system. The above method and apparatus overcome the limitation of using a single camera, and thus solve the problems encountered in related art techniques. The apparatus may include at least one portion (e.g. part or all) of the counter system. For example, the apparatus may include: an interface circuit and a processing circuit coupled to each other, in which the interface circuit may be coupled to the cameras, and the processing circuit may be arranged to control operations of the apparatus. For better comprehension, the counter system may be a people counter system, but the present invention is not limited thereto. In some embodiments, the counter system may perform related operations for any type of various types of video objects. Examples of the types of video objects may include (but are not limited to): pedestrians, transportations (e.g. vehicles) and animals (e.g. dogs and cats) in movement.

Figure 1:
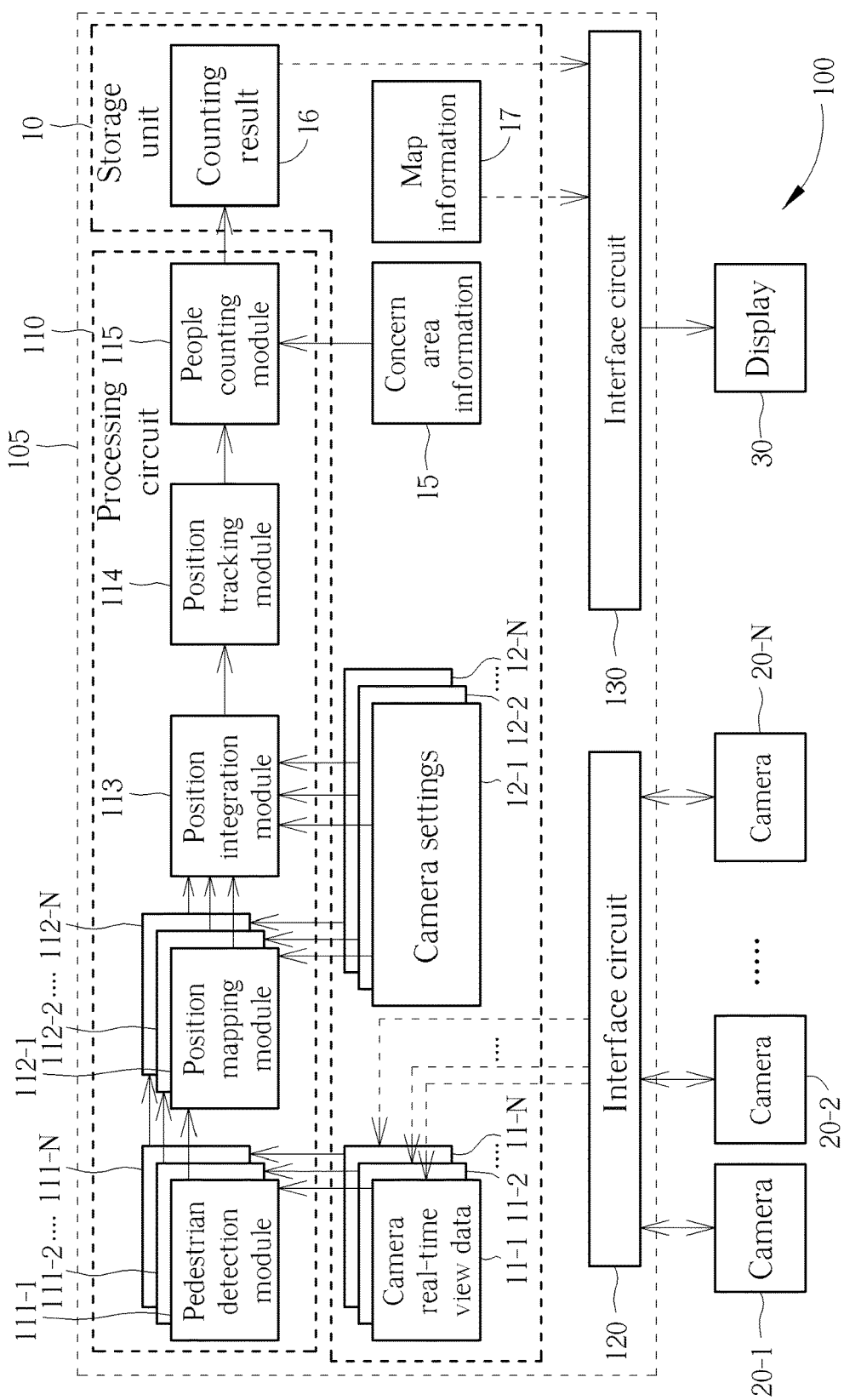
FIG. 1 is a diagram of a counter system according to an embodiment of the present invention.

FIG. 1 is a diagram of a counter system 100 according to an embodiment of the present invention. The counter system 100 may be an example of the above counter system, and a host device 105 in the counter system 100 may be an example of the apparatus. In addition to the host device 105, the counter system 100 may include a plurality of cameras, such as N cameras 20-1, 20-2, ..., and 20-N (in which the symbol "N" may represent an integer that is greater than 1), and may further include a display 30, in which the N cameras 20-1, 20-2, ..., and 20-N may be taken as an example of the multiple cameras.

As shown in FIG. 1, the host device 105 may include a storage unit 10, the processing circuit 110, and interface circuits 120 and 130. Examples of the storage unit 10 may include (but are not limited to): volatile memories such as random access memories (RAMS), non-volatile memories such as Flash memories, and any of various types of storage units. According to this embodiment, the storage unit 10 may store associated information of the method. Examples of the associated information may include (but are not limited to): live view data 11-1, 11-2, ..., and 11-N obtained from the N cameras 20-1, 20-2, ..., and 20-N; the camera settings 12-1, 12-2, ..., and 12-N of the N cameras 20-1, 20-2, ..., and 20-N, respectively; interest area information 15; counting results 16 generated by the processing circuit 110; and map information 17 of the electronic map. Further, the processing circuit 110 may include a plurality of modules, and the modules may include the pedestrian detection modules 111-1, 111-2, ..., and 111-N, the position mapping modules 112-1, 112-2, ..., and 112-N, the position integration module 113, the position tracking module 114 and the people counting module 115. For example, the processing circuit 110 may include at least one processor to execute multiple program modules corresponding to the method, in which the modules in the processing circuit 110 may be implemented as the multiple program modules. In another example, the processing circuit 110 may include a customized circuit, such as an application-specific integrated circuit (ASIC), and the customized circuit may include multiple sub-circuits to execute various operations corresponding to the method, in which the modules in the processing circuit 110 may be implemented as the multiple sub-circuits. In addition, the interface circuit 120 may be coupled to the N cameras 20-1, 20-2, ..., and 20-N, and the interface circuit 130 may be coupled to the display 30. For example, the host device 105 may further include a bus (not shown), and multiple elements in the host device 105, such as the storage unit 10, the processing circuit 110, and interface circuits 120 and 130, may be coupled to one another via the bus. Hence, the image data of the images captured by the N cameras 20-1, 20-2, ..., and 20-N may be respectively transmitted to the storage unit 10 via the interface circuit 120, and the display data including the counting result 16 and the map information 17 may be transmitted to the display 30 via the interface circuit 130. The arrow between the storage unit 10 and the interface circuit 120, and the arrow between the storage unit 10 and the interface circuit 130 are illustrated with dashed lines, to represent that the transmitted data may be further processed and/or transformed by one or more elements. For example, the processing circuit 110 may preprocess the image data to generate the camera live view data 11-1, 11-2, ..., and 11-N. In another example, the processing circuit 110 may directly use the image data as the camera live view data 11-1, 11-2, ..., and 11-N. In yet another example, the processing circuit 110 may refer to the counting result 16 and the map information 17 to generate the display data, to allow the user to see the counting result 16 and the electronic map on the display 30. In another example, based on the user settings, the processing circuit 110 may selectively refer to one of the counting result 16 and map information 17 to generate the display data, in order to allow the user to see one of the counting result 16 and the electronic map on the display 30.

Figure 2:
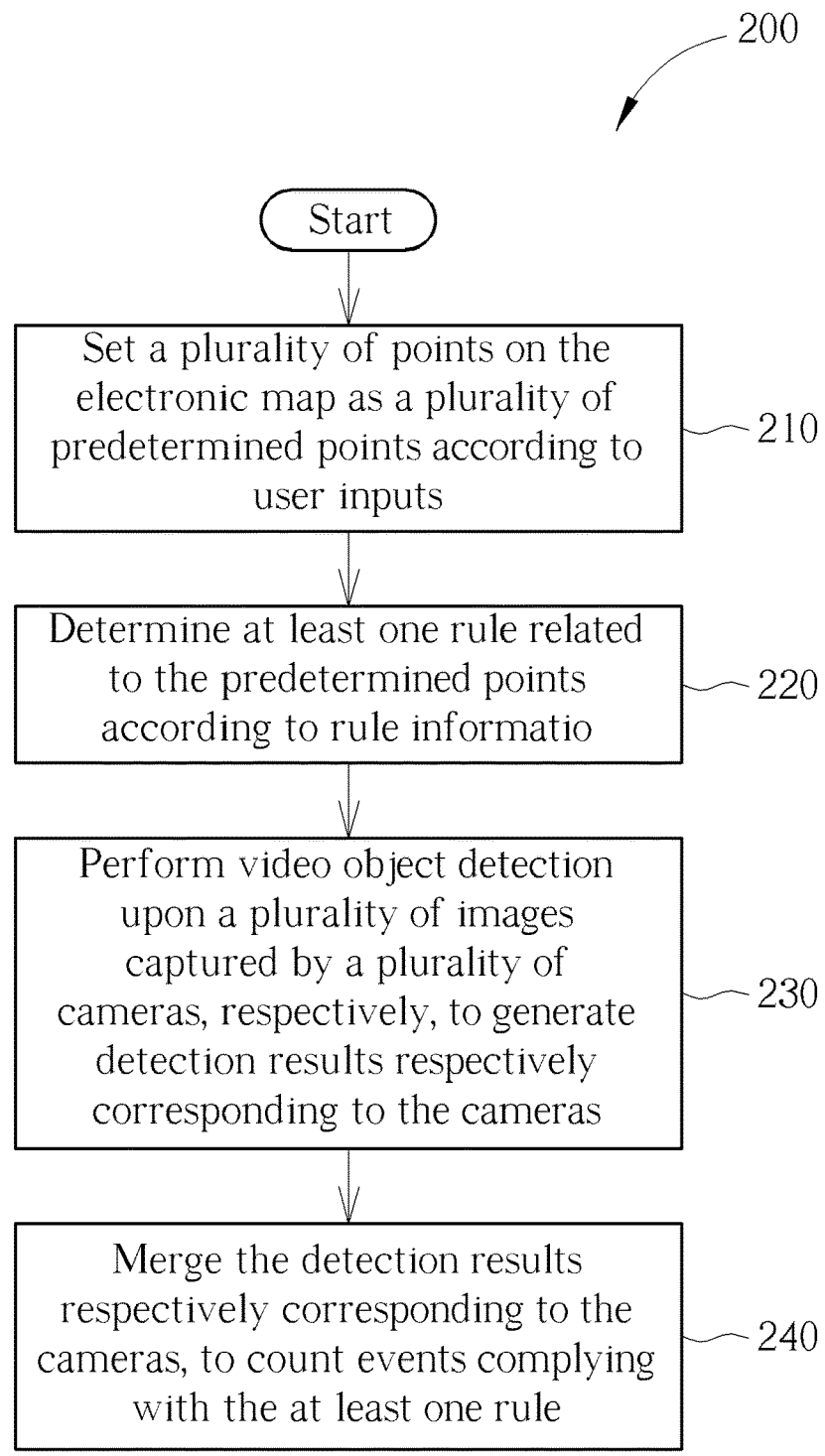
FIG. 2 is a flowchart of a method for performing cooperative counting according to an embodiment of the present invention.

FIG. 2 is a flowchart of a method 200 for performing cooperative counting according to an embodiment of the present invention, where the method 200 shown in FIG. 2 may be an example of the aforementioned method mentioned above. The aforementioned method (e.g. the method 200) is applicable to the above counter system such as the counter system 100, and more particularly to the host device 105 therein. In addition, the method 200 is applicable to the processing circuit 110.

In Step 210, the processing circuit 110 may set a plurality of points on the electronic map as a plurality of predetermined points (e.g. the predetermined points 321 and 322 illustrated in the follow-up embodiments) according to user inputs. For example, the processing circuit 110 may provide at least one user interface to allow the user to designate the points as the predetermined points. According to this embodiment, the predetermined points may indicate any of various types of geometric graphics on the electronic map. For example, the predetermined points may indicate at least one predetermined line segment (e.g. one or more predetermined line segments, such as a single predetermined line segment or a predetermined polyline) on the electronic map, in which the predetermined points may include the endpoints of the predetermined line segment. In another example, the predetermined points may indicate the boundary of a predetermined area on the electronic map, for designating the predetermined area, in which the predetermined points may include points positioned on the boundary, or points for defining the boundary. In another example, the predetermined points may indicate a predetermined curve on the electronic map, such as the boundary of the predetermined area, where the predetermined points may include multiple points for defining the predetermined curve.

In Step 220, the processing circuit 110 may determine at least one (e.g. one or more) rule related to the predetermined points according to rule information, where the rule information may be stored in the counter system 100. For example, the processing circuit 110 may provide at least one user interface to allow the user to set the rule information, and may store the rule information into the storage unit 10. In another example, the rule information may be default rule information, and may be pre-loaded to the storage unit 10, for being utilized by the processing circuit 110.

In Step 230, the processing circuit 110 may perform video object detection upon a plurality of images captured by the N cameras 20-1, 20-2, . . . , and 20-N, respectively (e.g. the images represented by the camera live view data 11-1, 11-2, . . . , and 11-N), to generate detection results respectively corresponding to the N cameras 20-1, 20-2, . . . , and 20-N. For example, the video object detection may include the image detection of a specific type, such as the pedestrian detection. In another example, the video object detection may include the image detection of any of various types of video objects.

According to this embodiment, the processing circuit 110 may perform the video object detection (e.g. the pedestrian detection) upon the images captured by the N cameras 20-1, 20-2, . . . , and 20-N, respectively (e.g. the images represented by the camera live view data 11-1, 11-2, . . . , and 11-N, respectively), to automatically generate a plurality of sets of candidate coordinate values, where the image capture ranges of the N cameras 20-1, 20-2, . . . , and 20-N are mapped to a plurality of areas on the electronic map, respectively, and the sets of candidate coordinate values represent the candidate positions of a plurality of video objects (e.g. a plurality of pedestrians) on the electronic map. A subset of the sets of candidate coordinate values is within an overlapping area of at least one portion of the areas (e.g. at least two areas).

The implementation details of the video object detection may be described as follows. The processing circuit 110 may perform video object image recognition (e.g. pedestrian image recognition) upon the images, respectively, to generate image coordinate values on the images, and perform a coordinate transformation to generate the sets of candidate coordinate values. For example, the pedestrian detection module 111-$n$ (in which the symbol "n" may represent an integer within the interval [1, N]) may perform the video object image recognition upon an image within the images (e.g. the image represented by the camera live view data 11-$n$), to automatically generate at least one set of image coordinate values in an image coordinate system of the image, where the image is captured by the camera 20-$n$, and the set of image coordinate values indicate the position of at least one video object of the video objects (e.g. the pedestrians) in the image. As a result, the pedestrian detection module 111-$n$ may generate the image coordinate values of all pedestrians in the image. Further, the position mapping module 112-$n$ may refer to the coordinate transformation reference information (e.g. the reference information in the camera settings 12-$n$) to perform the coordinate transformation upon the set of image coordinate values, in order to automatically generate at least one set of candidate coordinate values in the sets of candidate coordinate values. The coordinate transformation reference information may include the transformation information of the image capture range of the camera 20-$n$ in the coordinate transformation, and the set of candidate coordinate values represent the candidate position of the video object of the video objects (e.g. the pedestrians) on the electronic map. As a result, the position mapping module 112-$n$ may generate the candidate coordinate values of all pedestrians in the image.

In Step 240, the processing circuit 110 may merge the detection results respectively corresponding to the N cameras 20-1, 20-2, . . . , and 20-N, to count events complying with the at least one rule. For example, the predetermined points may indicate the predetermined line segment (e.g. the one or more predetermined line segments, such as the single predetermined line segment or the polyline), and the events complying with the rule may include an event of a video object (e.g. a pedestrian) passing through the predetermined line segment. In another example, the predetermined points may indicate the boundary of the predetermined area, and the events complying with the rule may include an event of a video object (e.g. a pedestrian) entering the predetermined area. In yet another example, the predetermined points may indicate the boundary of the predetermined area, and the events complying with the rule may include an event of this video object (e.g. the pedestrian) entering the predetermined area and staying in the predetermined area for a predetermined time period (e.g. 5 minutes). Please note that the predetermined time period may vary (more particularly, may be any of other lengths of time) in other examples. In this embodiment, the processing circuit 110 may selectively alter the subset of the sets of candidate coordinate values in order to transform the sets of candidate coordinate values into a plurality of sets of coordinate values, where the sets of coordinate values represent the positions of the video objects (e.g. the pedestrians) on the electronic map. Further, the processing circuit 110 may monitor the video objects according to the sets of coordinate values, in order to count the events complying with the rule. For example, the predetermined points may indicate a predetermined geometric graphic (e.g. the predetermined line segment, the predetermined curve, or the boundary of the predetermined area) on the electronic map. For better comprehension, the predetermined line segment may be taken as an example of the predetermined geometric graphic. As a result, the events complying with the rule may include an event of one pedestrian passing through the predetermined line segment. When the processing circuit 110 monitors the video objects according to the sets of coordinate values in order to count the events complying with the rule, the processing circuit 110 may monitor the pedestrians according to the sets of coordinate values in order to count the number of pedestrians passing through the predetermined line segment within the plurality of pedestrians mentioned above. This is not a limitation of the present invention; the predetermined curve or the boundary of the predetermined area may also be taken as an example of the predetermined geometric graphic.

According to this embodiment, the processing circuit 110 (e.g. the position integration module 113) may refer to a predetermined distance threshold to determine whether multiple sets of candidate coordinate values respectively corresponding to different cameras within the plurality of sets of candidate coordinate values represent the same video object (e.g. a pedestrian), to selectively merge the multiple sets of candidate coordinate values into a set of coordinate values within the sets of coordinate values. For example, when the distance(s) between the points represented by the multiple sets of candidate coordinate values (e.g. the distance between two points represented by two sets of candidate coordinate values in a situation where the multiple sets of candidate coordinate values represent the two sets of candidate coordinate values, or the distance between any two points selected from three or more points represented by three or more sets of candidate coordinate values in a situation where the multiple sets of candidate coordinate values represent the three or more sets of candidate coordinate values) are less than the predetermined distance threshold, the position integration module 113 may merge the multiple sets of candidate coordinate values into the set of coordinate values within the sets of coordinate values. In another example, when the distance(s) between the multiple points are less than or equal to the predetermined distance threshold, the position integration module 113 may merge the multiple sets of candidate coordinate values into the set of coordinate values within the sets of coordinate values.

The way of merging the multiple sets of candidate coordinate values by the processing circuit 110 (more particularly, the position integration module 113 therein) may vary. For example, when the distance(s) between the multiple points are less than the predetermined distance threshold, the position integration module 113 may select a set of candidate coordinate values from the multiple sets of candidate coordinate values as the set of coordinate values mentioned above. In another example, when distance(s) between the multiple points are less than the predetermined distance threshold, the position integration module 113 may perform an average calculation upon the multiple sets of candidate coordinate values to generate the set of coordinate values mentioned above. According to some embodiments, the average calculation may be a weighted average calculation.

For example, under the situation where the video object image recognition is the pedestrian image recognition, the processing circuit 110 may monitor the pedestrians according to the sets of coordinate values in Step 240 in order to count the number of pedestrians passing through the predetermined line segment among the plurality of pedestrians, where the predetermined line segment may be designated in advance. Based on the architecture shown in FIG. 1, the processing circuit 110 (e.g. the position tracking module 114) may refer to the sets of coordinate values to track the pedestrians to find their latest positions. Further, the processing circuit 110 (e.g. the people counting module 115) may refer to the moving trajectories of the pedestrians and the position(s) of the predetermined line segment to count the number of pedestrians passing through the predetermined line segment. For example, the processing circuit 110 may provide the user interface mentioned in Step 210 to allow the user of the counter system 100 to designate the predetermined line segment on the electronic map. After the user designates the predetermined line segment, the processing circuit 110 may store parameters related to the predetermined line segment as the interested area information 15. As a result, before performing the operations in Step 230 to Step 240, the interested area information 15 is already prepared for the people counting module 115, for being utilized by the people counting module 115 when needed.

According to this embodiment, at least one portion (e.g. part or all) of the operations in Steps 210 to 240 may be performed repeatedly. The image data may be continuously transmitted from the N cameras 20-1, 20-2, . . . , and 20-N to the host device 105, and the camera live view data 11-1, 11-2, . . . , and 11-N may be updated correspondingly. Each module in the processing circuit 110 may operate cooperatively in order to continuously update the counting result 16. Further, the processing circuit 110 may output the map information 17 of the electronic map in order to display the electronic map on the display 30, and mark up the video objects (e.g. the pedestrians) on the electronic map in order to allow the user to obtain the latest positions and moving trajectories of the video objects (e.g. the pedestrians).

Based on the architecture shown in FIG. 1, since the associated calculation result(s) may be mapped onto the electronic map, the user may immediately perceive the meanings of the monitored data. Hence, the method and the apparatus may enhance the user experience, and overcome problems existing in the related art.

Figure 3:
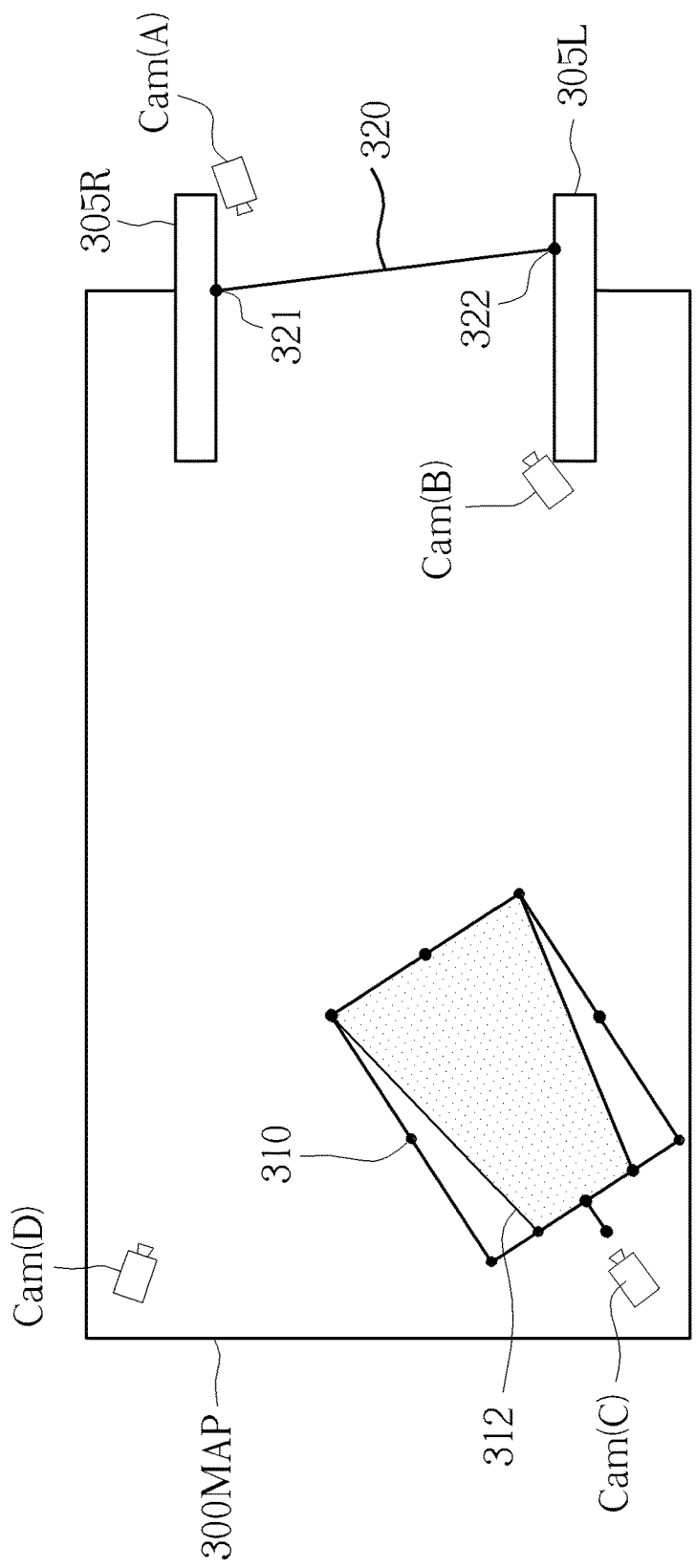
FIG. 3 illustrates a user setting scheme of the method shown in FIG. 2 according to an embodiment of the present invention.

FIG. 3 illustrates a user setting scheme of the method 200 shown in FIG. 2 according to an embodiment of the present invention, where the electronic map 300MAP may be taken as an example of the electronic map mentioned above, and the cameras Cam(A), Cam(B), Cam(C) and Cam(D) may be taken as an example of the cameras 20-1, 20-2, . . . , and 20-N on the electronic map 300MAP. In this embodiment, the electronic map 300MAP may present an interior space (e.g. a meeting room, a laboratory, a factory workshop, or the lobby of a building), the doorway may be positioned at the right side of the electronic map 300MAP, and the barriers 305L and 305R are positioned on either side of the doorway. Based on the user interface, the user may designate the predetermined line segment (e.g. the predetermined line segment 320, which may be regarded as an alerting line) on the electronic map 300MAP for counting people. More particularly, the user may designate the position of the predetermined line segment by designating the positions of the two endpoints of the predetermined line segment. For example, in Step 210, the user may specify two points 321 and 322 on the electronic map 300MAP to specify the position of the predetermined line segment 320, and the processing circuit 110 may refer to the user inputs to set the points 321 and 322 as the predetermined points, where the points 321 and 322 may be called predetermined points 321 and 322, and may be taken as an example of the predetermined points mentioned above. Further, the user interface allows the user to set the areas corresponding to the image capture ranges of the cameras Cam(A), Cam(B), Cam(C) and Cam(D) on the electronic map 300MAP, respectively, where the processing circuit 110 may store related settings of the cameras Cam(A), Cam(B), Cam(C) and Cam(D) in the storage unit 10, and the related settings may be taken as an example of the camera settings 12-1, 12-2, . . . , and 12-N. For example, the user may utilize the settings frame 310 on the electronic map 300MAP to set the position, size, shape and direction of the area 312 (e.g. the area mapped from the image capture range of the camera Cam(C) on the electronic map 300MAP).

Figure 4:
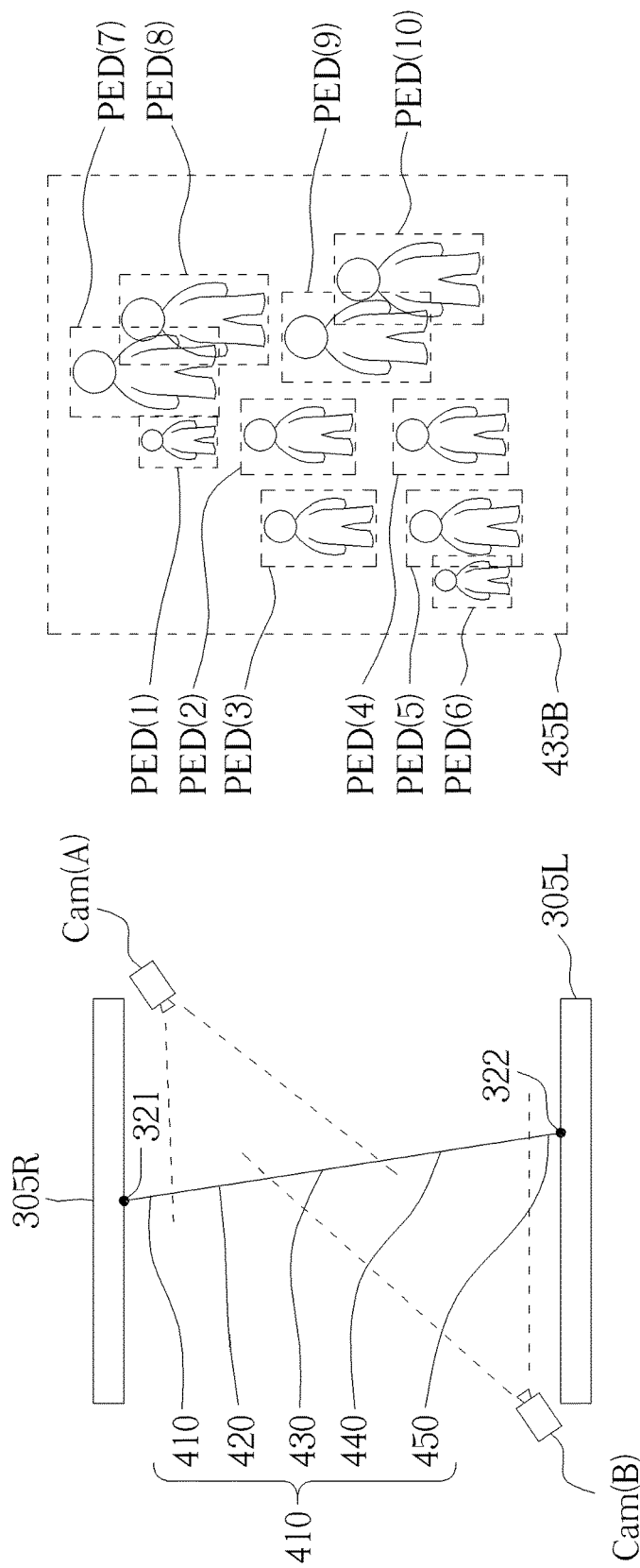
FIG. 4 illustrates a multi-camera pedestrian detection scheme of the method shown in FIG. 2 according to an embodiment of the present invention.

FIG. 4 illustrates a multi-camera pedestrian detection scheme of the method 200 shown in FIG. 2 according to an embodiment of the present invention. The two dashed lines in front of the lens of each of the cameras Cam(A) and Cam(B) represent the field of view thereof. On the electronic map 300MAP, the predetermined line segment 320 may be divided into the line segments 410, 420, 430, 440 and 450 according to where the dashed lines intersect. The line segments 410, 420, 430, 440 and 450 may be viewed as sub-alerting lines of the alerting line 320. In this embodiment, the line segments 410 and 450 are sub-alerting lines that cannot be monitored by the cameras Cam(A) and Cam(B). The line segments 420 and 430 may represent sub-alerting lines being monitored by the camera Cam(A), and the line segments 430 and 440 may represent the sub-alerting lines being monitored by the camera Cam(B). For example, the camera Cam(B) may capture a picture 435B, which may be an example of the image, and the processing circuit 110 (e.g. the pedestrian detection module 111-$n1$, in which the symbol "$n1$" may represent an integer within the interval [1,N]) may detect ten pedestrians {PED(1), PED(2), PED(3), PED(4), PED(5), PED(6), PED(7), PED(8), PED(9), PED(10)} in the picture 435B, and generate ten sets of candidate coordinate values of the ten pedestrians, respectively.

Figure 5:
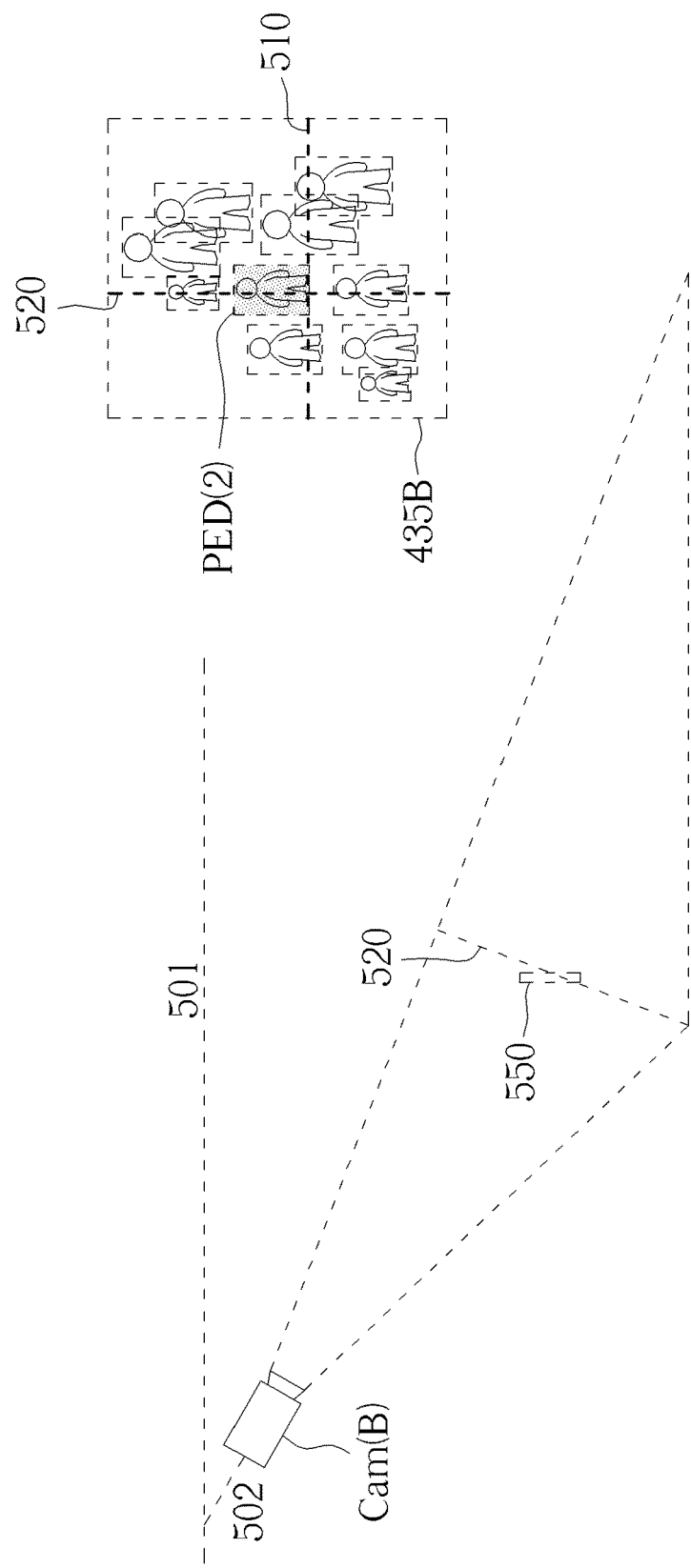
FIG. 5 illustrates a position mapping scheme of the method shown in FIG. 2 according to an embodiment of the present invention.

FIG. 5 illustrates a position mapping scheme of the method 200 shown in FIG. 2 according to an embodiment of the present invention, where at least one portion of the reference lines {501, 502, 510, 520} may indicate the positions and/or angles related to the camera Cam(B) and the pedestrian PED(2). For example, the reference line 501 may represent the celling, the reference line 502 may represent the line elongated along the optical axis of the lens of the camera Cam(B), and the two dashed lines in front of the camera Cam(B) may represent the field of view of the camera Cam(B). At the bottom of FIG. 5, the horizontal line segment positioned between the two dashed lines representing the field of view of the camera Cam(B) may represent the image capture range of the camera Cam(B) on the ground. Further, the reference lines 510 and 520 in the picture 435B are a horizontal line and a vertical line, which are respectively parallel to the X-axis and the Y-axis of the image coordinate system of the picture 435B.

According to this embodiment, the processing circuit 110 (e.g. the position mapping module 112-n1 therein) may perform X-axis mapping and Y-axis mapping, in order to map the position detection result of the pedestrian PED(2) onto the electronic map 300MAP. For example, the location of the center point of the bottom of the rectangle where the pedestrian PED(2) may represent the location where the pedestrian stands. The processing circuit 110 may detect a set of image coordinate values of the center point, and utilize the set of image coordinate values as the position detection result of the pedestrian PED(2) on the picture 435B. Please note that a reference line in the field of view of the camera Cam(B) may also be denoted by the numeral "520", since the picture 435B viewed from the camera CAM (B) will appear to be in the same location as the reference line 520 within the field of view of the camera Cam(B) as shown in the left half of FIG. 5. For better comprehension, the rectangle denoted by the numeral "550" may approximately represent the position of the pedestrian PED(2) in the picture 435B.

Figure 6:
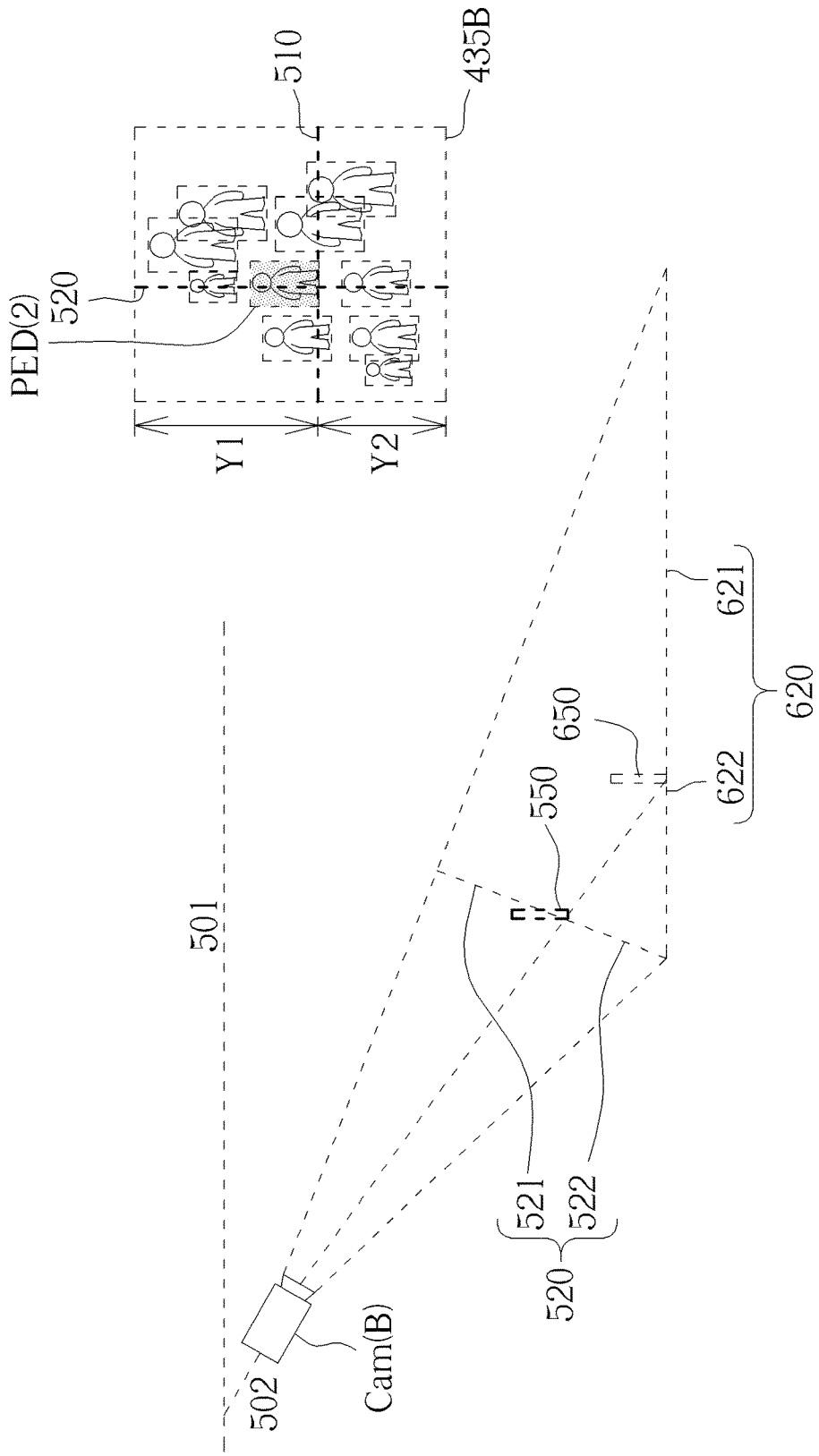
FIG. 6 illustrates a y-axis mapping operation of the position mapping scheme shown in FIG. 5 according to an embodiment of the present invention.

FIG. 6 illustrates a y-axis mapping operation of the position mapping scheme shown in FIG. 5 according to an embodiment of the present invention, where at least one portion of the reference lines {501, 502, 510, 520, 521, 522, 620, 621, 622} may indicate the positions and/or angles related to the camera Cam(B) and the pedestrian PED(2). When performing the X-axis mapping and the Y-axis mapping, the processing circuit 110 (e.g. the position mapping module 112-n1 therein) may refer to the position ratios of the center point on the reference lines 510 and 520, respectively, to map the position detection result (e.g. the set of image coordinate values of the center point) of the pedestrian PED(2) onto the electronic map 300MAP from the picture 435B. For example, regarding the Y-axis mapping, the rectangle denoted by the numeral "650" may approximately represent the position of the pedestrian PED(2) with respect to the electronic map 300MAP. As shown in FIG. 6, the reference line 520 includes reference line segments such as the reference lines 521 and 522, and the reference line 620 includes reference line segments such as the reference lines 621 and 622. It is known that the ratio of the length of reference line 521 to the length of the reference line 522 is equal to the ratio of the mapping parameter Y1 to the mapping parameter Y2, i.e. (Y1/Y2). Based on the geometry relationship shown in FIG. 6, the ratio of the length of the reference line 621 to the length of the reference line 622 is equal to the ratio of the length of the reference line 521 to the length of the reference line 522, and is thus also equal to the ratio of the mapping parameter Y1 to the mapping parameter Y2, i.e. (Y1/Y2). Since one skilled in the art will readily know how to implement the X-axis mapping by referring to the above illustrations pertaining to the Y-axis mapping, some implementation details pertaining to the X-axis mapping are omitted here for brevity.

Figure 7:
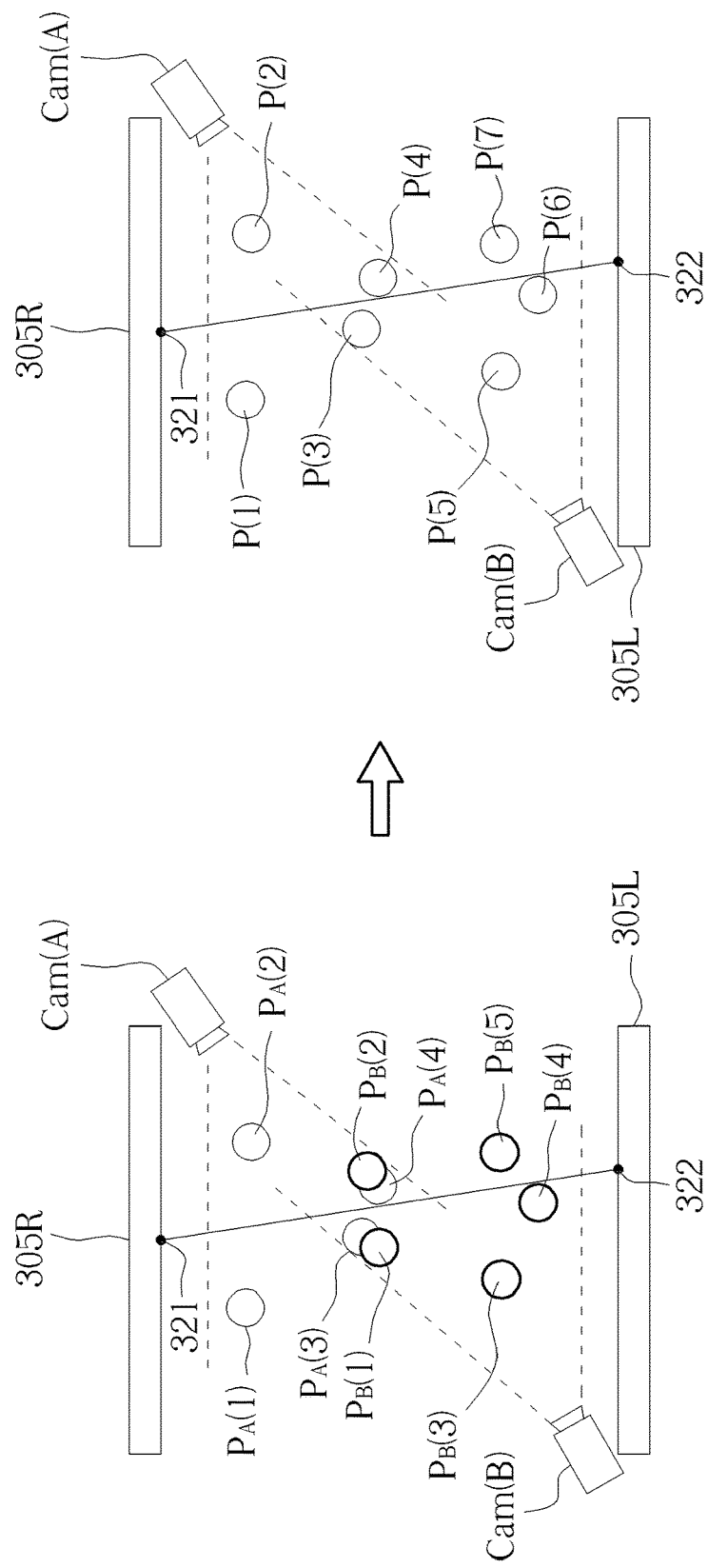
FIG. 7 illustrates a detection point merging scheme of the method shown in FIG. 2 according to an embodiment of the present invention.

FIG. 7 illustrates a detection point merging scheme of the method 200 shown in FIG. 2 according to an embodiment of the present invention. Since each pedestrian actually occupies a portion of the real space, rather than a single point in the real space, the pedestrians may be marked with circles on the electronic map 300MAP, where the center of each of the circles may be regarded as a detection point. For brevity, the respective centers of the circles are not depicted in FIG. 7, and symbols are simply added on the circles to indicate the corresponding detection points. As shown in the left half of FIG. 7, a plurality of sets of map coordinate values of the detection points $\{P_A(1), P_A(2), P_A(3), P_A(4), P_B(1), P_B(2), P_B(3), P_B(4), P_B(5)\}$ on the electronic map 300MAP may be taken as an example of the sets of candidate coordinate values mentioned above. Further, as shown in the right half of FIG. 7, a plurality of sets of map coordinate values of the detection points {P(1), P(2), P(3), P(4), P(5), P(6), P(7)} on the electronic map 300MAP may be taken as an example of the sets of coordinate values.

According to this embodiment, the position integration module 113 may obtain all detection points from the position mapping modules 112-1, 112-2, ..., and 112-N, may combine these detection points together on the electronic map 300MAP, and may merge some detection points in the overlapping area. For example, the position mapping module 112-n0 may perform the X-axis mapping and Y-axis mapping (in which the symbol "n0" may represent a positive integer within the interval [1, N] and non-equal to n1) in order to map the position detection results of a first set of pedestrians in a certain image (e.g. all pedestrians in this image) captured by the camera Cam(A) onto the electronic map 300MAP, to thereby generate a first set of detection points $\{P_A(1), P_A(2), P_A(3), P_A(4)\}$. Further, the position mapping module 112-n1 may perform the X-axis mapping and Y-axis mapping in order to map the position detection results of a second set of pedestrians in a certain image (e.g. all pedestrians in this image) captured by the camera Cam (B) onto the electronic map 300MAP, to thereby generate a second set of detection points $\{P_B(1), P_B(2), P_B(3), P_B(4), P_B(5)\}$. As shown in the left half of FIG. 7, the detection points in the overlapping area may include the detection points $P_A(3), P_A(4), P_B(1)$ and $P_B(2)$. The detection points $P_A(3)$ and $P_B(1)$ are close to each other, and possibly represent the same pedestrian. When the distance between the detection points $P_A(3)$ and $P_B(1)$ is less than the predetermined distance threshold, the position integration module 113 may merge the set of candidate coordinate values of the detection point $P_A(3)$ and the set of candidate coordinate values of the detection point $P_B(1)$ into the set of coordinate values of the detection point P(3). For example, the position integration module 113 may select one of the detection points $P_A(3)$ and $P_B(1)$ such as the detection point which is closest to the predetermined line segment 320 as the detection point P(3). Similarly, the detection points $P_A(4)$ and $P_B(2)$ are close to each other, and possibly represent the same pedestrian. When the distance between the detection points $P_A(4)$ and $P_B(2)$ is less than the predetermined distance threshold, the position integration module 113 may merge the set of candidate coordinate values of the detection point $P_A(4)$ and the set of candidate coordinate values of the detection point $P_B(2)$ into the set of coordinate values of the detection point P(4). For example, the position integration module 113 may select one of the detection points $P_A(4)$ and $P_B(2)$ such as the detection point which is closest to the predetermined line segment 320 as the detection point P(4). As a result, the position integration module 113 may transform the sets of map coordinate values of the detection points $\{P_A(1), P_A(2), P_A(3), P_A(4), P_B(1), P_B(2), P_B(3), P_B(4), P_B(5)\}$ into the sets of map coordinate values of the detection points {P(1), P(2), P(3), P(4), P(5), P(6), P(7)}, where the position integration module 113 may directly utilize the detection points {$P_A(1)$, $P_A(2)$, $P_B(3)$, $P_B(4)$, $P_B(5)$} as the detection points {P(1), P(2), P(5), P(6), P(7)}, without the need for altering each set of map coordinate values thereof.

The implementation details of determining the overlapping area may be described as follows. The position integration module 113 may refer to the camera settings 12-$n0$ and 12-$n1$ to determine two areas respectively mapped onto the electronic map 300MAP from the image capture ranges of the cameras Cam(A) and Cam(B), and may refer to the boundaries of the two areas, respectively, to find a common area where the two areas overlap each other. The common area may be taken as an example of the overlapping area. As a result, the position integration module 113 may combine all detection points together, and merge the detection points in the overlapping area.

In some embodiments, the position integration module 113 may refer to at least three camera settings within the camera settings 12-1, 12-2, . . . , and 12-N to determine at least three areas mapped on the electronic map by the image capture ranges of at least three cameras, respectively, and may refer to the respective boundaries of the three areas to find a common area where the three areas overlap each other, in which this common area may be taken as an example of the overlapping area. As a result, the position integration module 113 may combine all detection points together, and may merge the detection points in the overlapping area.

Figure 8:
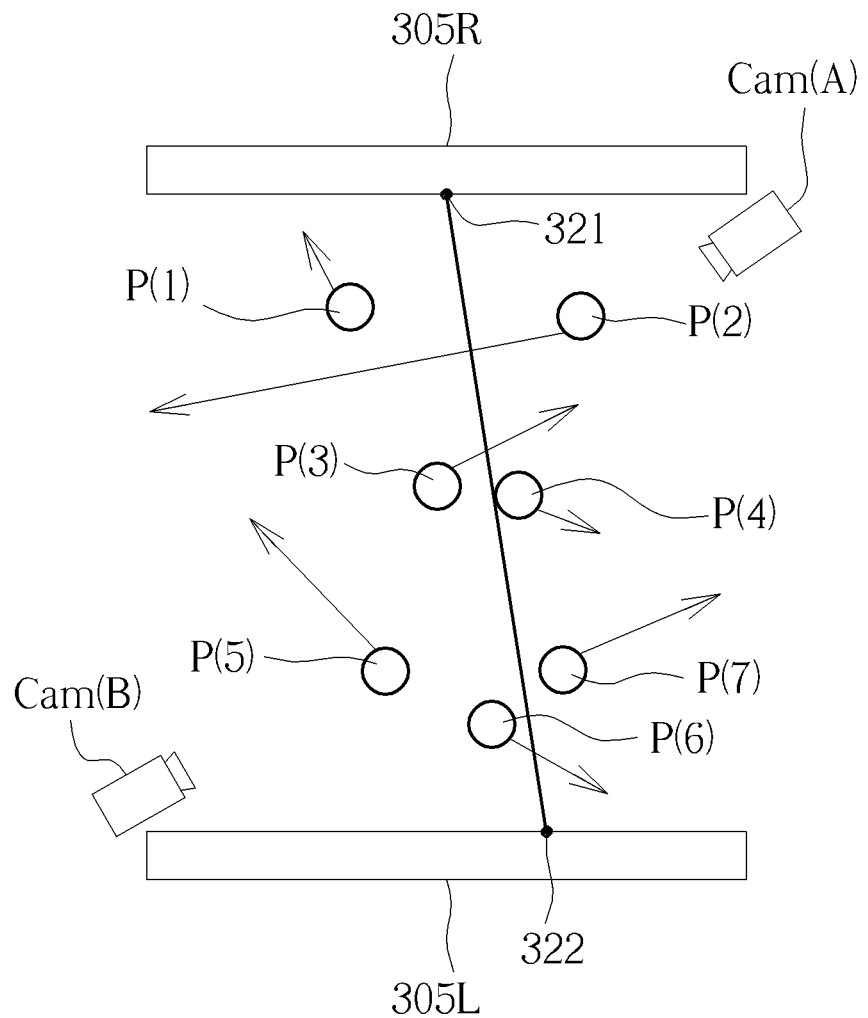
FIG. 8 illustrates a tracking and counting scheme of the method shown in FIG. 2 according to an embodiment of the present invention.

FIG. 8 illustrates a tracking and counting scheme of the method 200 shown in FIG. 2 according to an embodiment of the present invention. The position tracking module 114 may respectively refer to the sets of map coordinate values of the detection points {P(1), P(2), P(3), P(4), P(5), P(6), P(7)} to track the pedestrians corresponding to the detection points {P(1), P(2), P(3), P(4), P(5), P(6), P(7)} to their latest positions on the electronic map 300MAP, and may output the latest positions (which is just found) to the people counting module 115. As a result, the people counting module 115 may monitor the latest positions of the pedestrians to determine the moving trajectories of the pedestrians. Further, the people counting module 115 may refer to the moving trajectories of the pedestrians and the positions of the predetermined line segment 320 in order to count the number of pedestrians that pass through the predetermined line segment 320. For example, the people counting module 115 may find the moving trajectories of four pedestrians corresponding to the detection points {P(1), P(4), P(5), P(7)} and accordingly determine if there is any pedestrian amongst the four pedestrians who does not pass through the predetermined line segment 320. More particularly, in this example, the four pedestrians corresponding to the detection points {P(1), P(4), P(5), P(7)} have not passed through the predetermined line segment 320 as shown in FIG. 8. In addition, the people counting module 115 may find the moving trajectories of the three pedestrians corresponding to the detection points {P(2), P(3), P(6)}, respectively, and accordingly determine that the three pedestrians pass through the predetermined line segment 320. Hence, the people counting module 115 may continuously track a series of detection points (e.g. the detection points {P(1), P(2), P(3), P(4), P(5), P(6), P(7)}) in a period in order to count the number of pedestrians that pass through the predetermined line segment 320 during that period.

According to some embodiments, the period mentioned above may start from a specific time point and last until the service life of the host device 105 is over. Examples of the time point may include (but are not limited to): the time point where the host device 105 is manufactured, the time point where the user resets the host device 105, and the time point where the counter value of the people counting module 115 is cleared. According to some embodiments, the period may be a predetermined period, and the processing circuit 110 may provide the user interface or another user interface to allow the user of the counter system 100 to designate the predetermined period.

In some embodiments, the people counting module 115 may include a Kalman filter. The people counting module 115 may utilize the Kalman filter to monitor the latest positions of the pedestrians and/or determine the moving trajectories of the pedestrians.

According to some embodiments, the apparatus may include at least one portion (e.g. part or all) of the counter system 100. For example, the apparatus may include a control circuit in the host device 105, such as at least one integrated circuit. In another example, the apparatus may include the host device 105 and one or more of the N cameras 20-1, 20-2, . . . , and 20-N. In another example, the apparatus may include the host device 105 and the display 30. In another example, the apparatus may include the whole counter system 100.

According to some embodiments, one or more of the N cameras 20-1, 20-2, . . . , and 20-N and/or the display 30 may be integrated into the host device 105. According to some embodiments, the host device 105 may include the whole counter system 100, in which the N cameras 20-1, 20-2, . . . , and 20-N and the display 30 may be integrated into the host device 105. In the host device 105 of some embodiments, the storage unit 10 may be integrated into the processing circuit 110.

Figure 9:
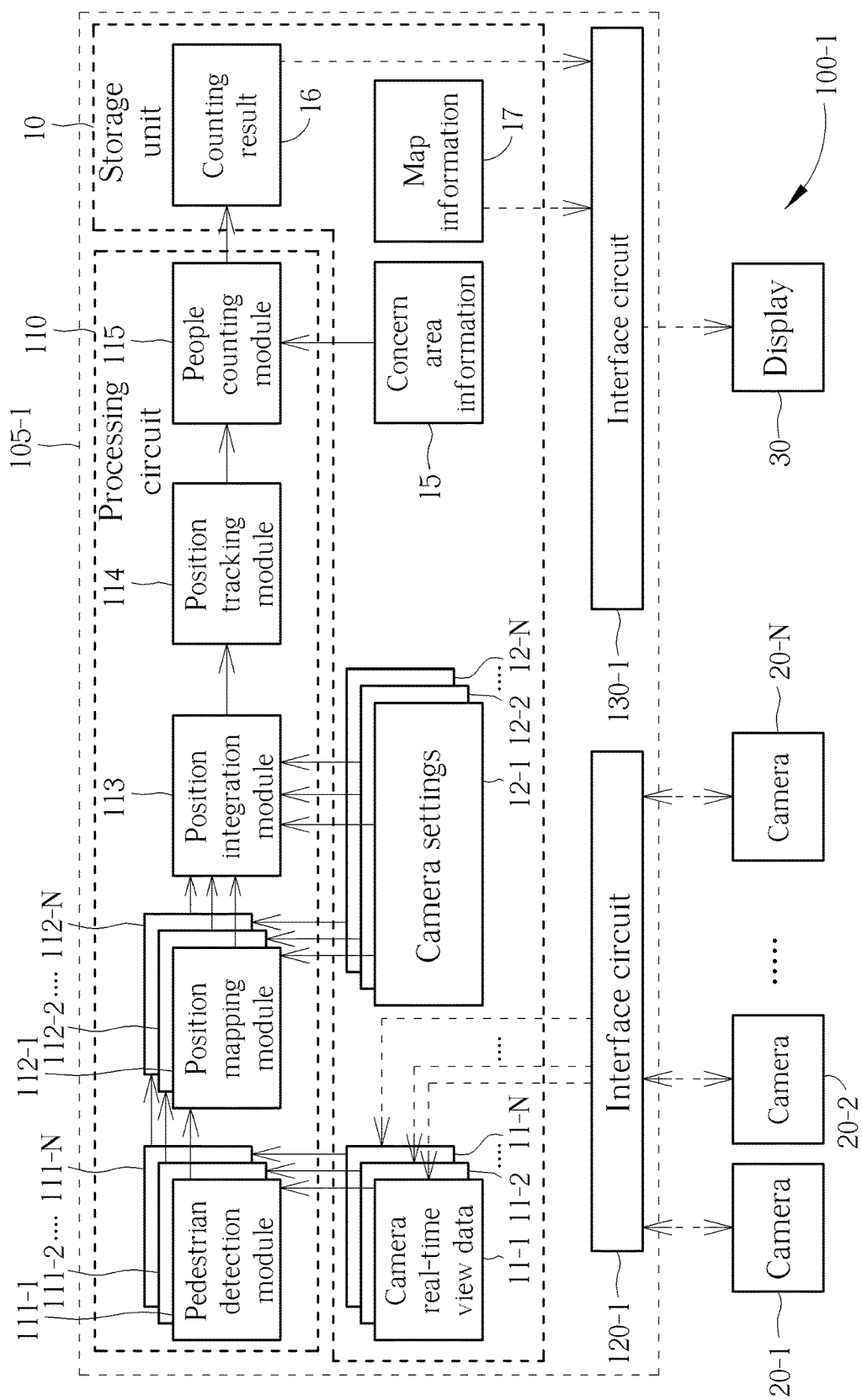
FIG. 9 is a diagram of a counter system according to another embodiment of the present invention.

FIG. 9 is a diagram of a counter system 100-1 according to another embodiment of the present invention, where a host device 105-1 in the counter system 100-1 may be taken as an example of the apparatus. The method (e.g. the method 200 shown in FIG. 2) and various control schemes thereof, such as that of the embodiments following the embodiment of FIG. 2, are applicable to the counter system 100-1 shown in FIG. 9 and the host device 105-1 therein, and are also applicable to the processing circuit 110 of this embodiment. Compared with the embodiment shown in FIG. 1, the interface circuit 120 is replaced with another interface circuit in this embodiment, such as the network interface circuit 120-1. Further, the N cameras 20-1, 20-2, . . . , and 20-N of this embodiment may be network cameras, which may communicate via a network. In practice, as long as the network cameras are connected to the network (e.g., through wired or wireless connection), they are capable of delivering information to the host device 105-1 via the network. Further, in this embodiment, the interface circuit 130 mentioned above is replaced with another interface circuit such as the wireless interface circuit 130-1, and the display 30 of this embodiment may be a display equipped with the capability of wireless communications functions. For example, the wireless interface circuit 130-1 and the display 30 of this embodiment may comply with one or more of the existing wireless communications specifications, to allow the display data to be transmitted to the display 30 via wireless transmissions. Some features in this embodiment similar to those in previous embodiments/modifications are omitted here for brevity.

According to some embodiments, the operations of the wireless interface circuit 130-1 may be performed by the network interface circuit 120-1, where the wireless interface circuit 130-1 may be replaced or omitted. Further, the display 30 of these embodiments may be implemented with a remote apparatus, such as a multifunctional mobile phone.

In practice, as long as the multifunctional mobile phone connects to a network, the multifunctional mobile phone may receive information from the host device 105-1 via the network. Some features in these embodiments similar to those in previous embodiments/modifications are omitted here for brevity.

According to some embodiments, the apparatus may include at least one portion (e.g. part or all) of the counter system 100-1. For example, the apparatus may include the host device 105-1, and may include one or more of the N cameras 20-1, 20-2, . . . , and 20-N and/or the display 30. According to some embodiments, one or more of the N cameras 20-1, 20-2, . . . , and 20-N and/or the display 30 may be integrated into the host device 105-1. According to some embodiments, the host device 105-1 may include the whole counter system 100-1, in which the N cameras 20-1, 20-2, . . . , and 20-N and the display 30 may be integrated into the host device 105-1. In the host device 105-1 of some embodiments, the storage unit 10 may be integrated into the processing circuit 110.

Figure 10:
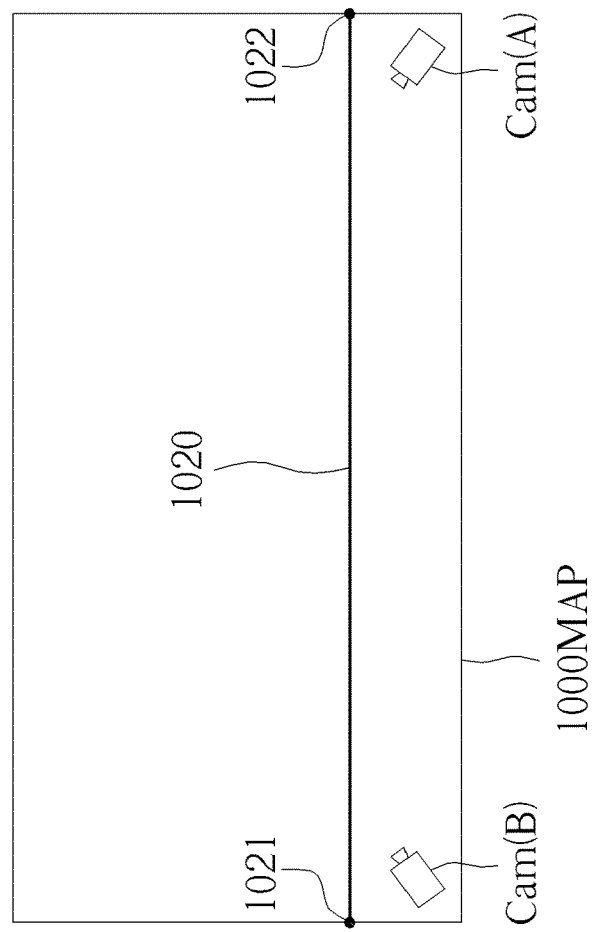
FIG. 10 illustrates an operation scenario according to an embodiment of the present invention.
Figure 10:
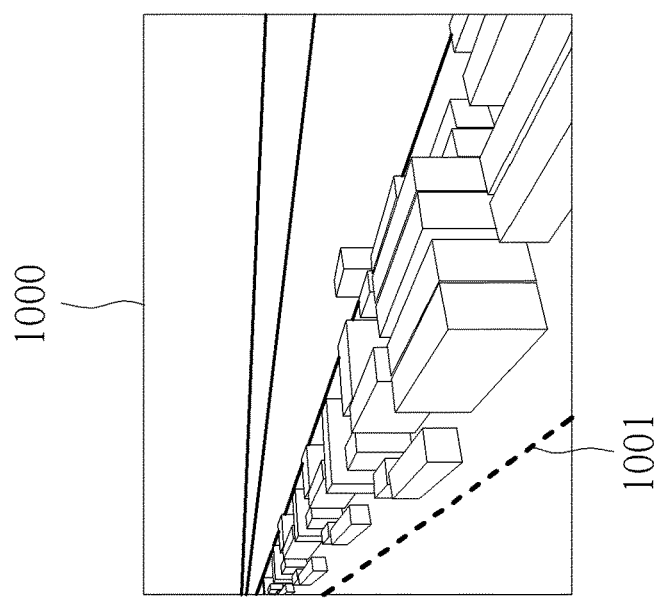

FIG. 10 illustrates an operation scenario according to an embodiment of the present invention. For example, the electronic map 300MAP may be replaced with the electronic map 1000MAP, and the predetermined line segment 320 may be replaced with the predetermined line segment 1020, where the predetermined points 321 and 322 may be replaced with the predetermined points 1021 and 1022. In this embodiment, the picture 1000 may be obtained from one of the N cameras 20-1, 20-2, . . . , and 20-N (e.g. the camera Cam(A)), and the intermodal containers shown in the picture 1000 may be distributed in the real space represented by the electronic map 1000MAP. Further, the reference line 1001 corresponds to a portion of the predetermined line segment 1020 only, rather than the entire predetermined line segment 1020. Based on the method, the processing circuit 110 in the apparatus may properly monitor the entire area with the aid of the N cameras 20-1, 20-2, . . . , and 20-N, and may integrate the monitoring information into the electronic map 1000MAP to allow the user to obtain the monitoring information fast and correctly.

In order to prevent the field of view from being blocked, the user of the aforementioned counter system (e.g. the administrator of the counter system 100) may install a first camera (e.g. the camera Cam(A)) with a large angle of depression. Regarding the first camera, the area which is unable to undergo automatic people counting may be much larger than the image capture range of the first camera. In this situation, the user may set one or more second cameras (e.g. the camera Cam(B)) to capture the area not in the image capture range of the first camera. The method and the apparatus may perform pedestrian detection operations respectively corresponding to the first camera and the second cameras, in order to transform the pedestrian position detection results to the map coordinate system of the electronic map 1000MAP, and partially combine and mix the pedestrian position transformation results to thereby generate a group of traceable detection points that represent pedestrians. Hence, the method and the apparatus may perform automatic people counting upon the entire area, and may correctly monitor the number of people. As a result, the efficiency of the counter system will not be lowered due to installing the first camera with the large angle of depression.

According to some embodiments, limited by the environment, the user may not install the first camera (e.g. camera Cam(A)) with a large angle of depression. To the first camera, it may be difficult to prevent the shading of the field of view. In this situation, the user may install one or more second cameras (e.g. the camera Cam(B)) to capture one or more areas corresponding to the shaded portion(s) of the field of view of the first camera. The method and the apparatus may perform pedestrian detection operations respectively corresponding to the first camera and the one or more second cameras, to transform the pedestrian position detection results to the map coordinate system of the electronic map 1000MAP, and partially combine and mix the pedestrian position transformation results to generate a group of traceable detection points that represent pedestrians. Hence, the method and the apparatus may perform automatic people counting upon the entire area, and may correctly monitor the number of people. As a result, the efficiency of the counter system will not be lowered due to the selected angle when installing the first camera.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing cooperative counting, wherein the method is applicable to a counter system, the counter system comprises a plurality of cameras, and the method comprises the following steps:

setting a plurality of points on an electronic map as a plurality of predetermined points according to user inputs;

determining at least one rule related to the predetermined points according to rule information, wherein the rule information is stored in the counter system;

performing video object detection upon a plurality of images captured by the cameras, respectively, to generate detection results respectively corresponding to the cameras;

merging the detection results respectively corresponding to the cameras, to count events complying with the at least one rule;

wherein the step of performing the video object detection upon the images to generate the detection results further comprises:

performing the video object detection upon the images captured by the cameras, respectively, to automatically generate a plurality of sets of candidate coordinate values, wherein image capture ranges of the cameras are mapped to a plurality of areas on the electronic map, respectively, the sets of candidate coordinate values represent candidate positions of a plurality of video objects on the electronic map, and a subset of the sets of candidate coordinate values is within an overlapping area of at least one portion of the areas;

wherein the step of merging the detection results to count the events complying with the at least one rule further comprises:

selectively altering the subset of the sets of candidate coordinate values to transform the sets of candidate coordinate values into a plurality of sets of coordinate values, wherein the sets of coordinate values represent positions of the video objects on the electronic map; and monitoring the video objects according to the sets of coordinate values to count the events complying with the at least one rule.

2. The method of claim 1, wherein the predetermined points indicate at least one predetermined line segment on the electronic map; and the events complying with the at least one rule comprise an event of a video object passing through the predetermined line segment.

3. The method of claim 1, wherein the predetermined points indicate a boundary of a predetermined area on the electronic map, for designating the predetermined area; and the events complying with the at least one rule comprise an event of a video object entering the predetermined area.

4. The method of claim 1, wherein the video object detection comprises image detection of a specific type of objects.

5. The method of claim 1, wherein the video object detection comprises pedestrian detection, and the video objects represent a plurality of pedestrians, wherein the sets of coordinate values represent positions of the pedestrians on the electronic map; and
the step of performing the video object detection upon the images to generate the detection results further comprises:
performing the pedestrian detection upon the images captured by the cameras, respectively, to automatically generate the sets of candidate coordinate values.

6. The method of claim 5, wherein the predetermined points indicate at least one predetermined line segment on the electronic map;
the events complying with the at least one rule comprises an event of a pedestrian passing through the predetermined line segment; and
the step of monitoring the video objects according to the sets of coordinate values to count the events complying with the at least one rule further comprises:
monitoring the plurality of pedestrians according to the sets of coordinate values to count one or more pedestrians passing through the predetermined line segment among the plurality of pedestrians.

7. The method of claim 1, wherein the step of performing the video object detection upon the images captured by the cameras, respectively, to automatically generate the sets of candidate coordinate values further comprises:
performing video object image recognition upon an image of the images, to automatically generate at least one set of image coordinate values in an image coordinate system of the image, wherein the set of image coordinate values indicate a position of at least one video object within the video objects in the image; and
performing a coordinate transformation upon the set of image coordinate values according to coordinate transformation reference information, to automatically generate at least one set of candidate coordinate values within the sets of candidate coordinate values, wherein the set of candidate coordinate values represent a candidate position of the video object within the video objects on the electronic map.

8. The method of claim 7, wherein the image is captured by a camera within the cameras, and the coordinate transformation reference information comprises transformation information of an image capture range of the camera for performing the coordinate transformation.

9. The method of claim 1, wherein the step of selectively altering the subset of the sets of candidate coordinate values to transform the sets of candidate coordinate values into the sets of coordinate values further comprises:
referring to a predetermined distance threshold to determine whether multiple sets of candidate coordinate values respectively corresponding to different cameras within the plurality of sets of candidate coordinate values represent a same video object, in order to selectively merge the multiple sets of candidate coordinate values into a set of coordinate values within the sets of coordinate values.

10. The method of claim 9, wherein the step of selectively altering the subset of the sets of candidate coordinate values to transform the sets of candidate coordinate values into the sets of coordinate values further comprises:
when a distance between multiple points represented by the multiple sets of candidate coordinate values is less than the predetermined distance threshold, merging the multiple sets of candidate coordinate values into the set of coordinate values within the sets of coordinate values.

11. The method of claim 10, wherein the step of selectively altering the subset of the sets of candidate coordinate values to transform the sets of candidate coordinate values into the sets of coordinate values further comprises:
when the distance between the multiple points is less than the predetermined distance threshold, selecting a set of candidate coordinate values within the multiple sets of candidate coordinate values as the set of coordinate values within the sets of coordinate values.

12. The method of claim 10, wherein the step of selectively altering the subset of the sets of candidate coordinate values to transform the sets of candidate coordinate values into the sets of coordinate values further comprises:
when the distance between the multiple points is less than the predetermined distance threshold, performing an average calculation upon the multiple sets of candidate coordinate values to generate the set of coordinate values within the sets of coordinate values.

13. The method of claim 12, wherein the average calculation is a weighted average calculation.

14. An apparatus for performing cooperative counting, wherein the apparatus is applicable to a counter system, the counter system comprises a plurality of cameras, and the apparatus comprises:
an interface circuit, arranged to couple to the cameras; and
a processing circuit, coupled to the interface circuit, the processing circuit arranged to control operations of the apparatus, wherein:
the processing circuit sets a plurality of points on an electronic map as a plurality of predetermined points according to user inputs;
the processing circuit determines at least one rule related to the predetermined points according to rule information, wherein the rule information is stored in the counter system;
the processing circuit performs video object detection upon a plurality of images captured by the cameras, respectively, to generate detection results respectively corresponding to the cameras;
the processing circuit merges the detection results respectively corresponding to the cameras, to count events complying with the at least one rule;
wherein the processing circuit performs the video object detection upon the images captured by the cameras to automatically generate a plurality of sets of candidate coordinate values, respectively, wherein image capture ranges of the cameras are mapped to a plurality of areas on the electronic map, respectively, and the sets of candidate coordinate values represent candidate positions of a plurality of video objects on the electronic map, and a subset of the sets of candidate coordinate values is within an overlapping area of at least one portion of the areas;

the processing circuit selectively alters the subset of the sets of candidate coordinate values in order to transform the sets of candidate coordinate values into a plurality of sets of coordinate values, wherein the sets of coordinate values represent positions of the video objects on the electronic map; and the processing circuit monitors the video objects according to the sets of coordinate values, in order to count the events complying with the at least one rule.

15. The apparatus of claim 14, wherein the video object detection comprises pedestrian detection, and the video objects represent a plurality of pedestrians, wherein the sets of coordinate values represent positions of the pedestrians on the electronic map; and the processing circuit performs the pedestrian detection upon the images captured by the cameras to automatically generate the sets of candidate coordinate values.

16. The apparatus of claim 15, wherein the predetermined points indicate at least one predetermined line segment on the electronic map; events complying with the at least one rule comprise an event of a pedestrian passing through the predetermined line segment; and the processing circuit monitors the pedestrians according to the sets of coordinate values, in order to count the number of pedestrians passing through the predetermined line segment.

17. The apparatus of claim 14, wherein the processing circuit performs video object image recognition upon an image within the images to automatically generate at least one set of image coordinate values in an image coordinate system of the image, wherein the set of image coordinate values indicate positions of at least one of the video objects in the image; and the processing circuit performs a coordinate transformation upon the set of image coordinate values according to coordinate transformation reference information, to automatically generate at least one set of candidate coordinate values in the sets of candidate coordinate values, wherein the set of candidate coordinate values represent a candidate position of the video object within the video objects on the electronic map.

18. The apparatus of claim 14, wherein the processing circuit determines whether multiple sets of candidate coordinate values within the sets of candidate coordinate values that belong to different cameras represent a same video object according to a predetermined distance threshold, in order to selectively merge the multiple sets of candidate coordinate values into a set of coordinate values within the sets of coordinate values.

* * * * *